(12) United States Patent
Follis

(10) Patent No.: US 10,026,109 B2
(45) Date of Patent: Jul. 17, 2018

(54) LINKING CONTRACTS TO DELIVERABLE ITEMS

(71) Applicant: Adobe Systems Incorporated, San Jose, CA (US)

(72) Inventor: Benjamin D. Follis, London (GB)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 631 days.

(21) Appl. No.: 14/644,859

(22) Filed: Mar. 11, 2015

(65) Prior Publication Data

US 2016/0267562 A1 Sep. 15, 2016

(51) Int. Cl.
*G06Q 10/08* (2012.01)
*G06Q 10/06* (2012.01)
*G06Q 50/18* (2012.01)
*G06Q 30/06* (2012.01)

(52) U.S. Cl.
CPC ....... *G06Q 30/0609* (2013.01); *G06Q 10/083* (2013.01); *G06Q 10/0833* (2013.01); *G06Q 30/0613* (2013.01); *G06Q 50/18* (2013.01)

(58) Field of Classification Search
None
See application file for complete search history.

(56) References Cited

U.S. PATENT DOCUMENTS

| | | | | | |
|---|---|---|---|---|---|
| 6,167,378 | A | * | 12/2000 | Webber, Jr. ...... | G06Q 10/06315 705/7.25 |
| 6,957,384 | B2 | * | 10/2005 | Jeffery .............. | G06F 17/30011 707/E17.008 |
| 7,363,509 | B2 | * | 4/2008 | Farquharson .......... | G06Q 10/10 713/161 |
| 7,552,132 | B2 | * | 6/2009 | Berry ..................... | G06Q 30/06 |
| 8,195,537 | B2 | * | 6/2012 | Bey ......................... | G06Q 10/20 705/30 |
| 8,626,622 | B2 | * | 1/2014 | Subramaniam ........ | G06Q 10/10 705/35 |
| 9,760,960 | B2 | * | 9/2017 | Laine ..................... | G06Q 50/18 |
| 2002/0095381 | A1 | * | 7/2002 | Takahashi ............ | G06Q 10/087 705/44 |
| 2003/0041049 | A1 | * | 2/2003 | Berry ..................... | G06Q 30/06 |
| 2003/0074216 | A1 | * | 4/2003 | Salle ..................... | G06Q 10/10 705/311 |

(Continued)

*Primary Examiner* — Nicholas D Rosen

(74) *Attorney, Agent, or Firm* — Wolfe-SBMC

(57) ABSTRACT

Techniques to link contracts to deliverable items are described. A contract service to collect and associate electronic signatures with contracts is implemented in an online retail environment for management of sale and delivery of items to consumers. The contract service facilitates real-time, on-line access to contracts between consumers and retailers for deliverable items at the time of delivery. In connection with a purchase transaction, a contract is generated via the contract service that is prepared for electronic signatures and has an associated contract identifier. The contract service obtains an item identifier that is uniquely associated with the deliverable item and links the contract to the item identifier. Then, a web accessible interface is exposed to enable look-up of the contract using the item identifier. At the time of delivery, the web accessible interface is employed to access the contract from the contract service for viewing and signing.

20 Claims, 5 Drawing Sheets

(56) References Cited

U.S. PATENT DOCUMENTS

| | | | |
|---|---|---|---|
| 2003/0130878 A1* | 7/2003 | Kruk | G06F 17/27 705/7.22 |
| 2005/0160278 A1* | 7/2005 | Farquharson | G06Q 10/10 713/189 |
| 2005/0246237 A1* | 11/2005 | Hudetz | G06F 17/30879 705/26.61 |
| 2005/0246294 A1* | 11/2005 | Farquharson | G06F 21/10 705/311 |
| 2006/0036587 A1* | 2/2006 | Rizk | G06F 17/30011 |
| 2007/0290836 A1* | 12/2007 | Ainsworth | G06Q 10/08 340/539.13 |
| 2008/0103935 A1* | 5/2008 | Pulnikova | G06Q 30/0613 705/26.41 |
| 2009/0157538 A1* | 6/2009 | Subramaniam | G06Q 10/10 705/35 |
| 2010/0299160 A1* | 11/2010 | Roscoe | G06Q 40/04 705/4 |
| 2011/0302063 A1* | 12/2011 | Bey | G06Q 10/20 705/30 |
| 2012/0046958 A1* | 2/2012 | Pynadath | G06Q 20/12 705/1.1 |
| 2013/0246289 A1* | 9/2013 | Ryu | G06Q 30/018 705/311 |
| 2013/0282524 A1* | 10/2013 | Appolito | G06Q 30/0613 705/26.41 |
| 2014/0052575 A1* | 2/2014 | Yu | G06O 30/0609 705/26.35 |
| 2014/0172739 A1* | 6/2014 | Anderson | G06Q 10/08355 705/338 |
| 2015/0019455 A1* | 1/2015 | Hilbush | G06Q 10/083 705/337 |
| 2015/0213568 A1* | 7/2015 | Follis | G06Q 50/18 705/311 |
| 2015/0379652 A1* | 12/2015 | Follis | G06Q 50/18 705/311 |
| 2016/0020909 A1* | 1/2016 | Gardenes Linan | G06Q 10/1091 713/175 |
| 2016/0171634 A1* | 6/2016 | Laine | G06Q 50/18 705/311 |

\* cited by examiner

LINKING CONTRACTS TO DELIVERABLE ITEMS

BACKGROUND

Consumers may buy or rent deliverable items from a retailer/seller through a retail system or otherwise. In a traditional approach, deliverable items such as shipping containers, consumer goods, and/or rental equipment may be provided with physical contracts and/or may be handled separately from the contracts that specify terms of the purchase/rental agreement. In some cases, one or more terms of the agreement may be filled out at the time of delivery. As such, a significant risk exists that an agent handling the delivery on behalf of a merchant may have incorrect documentation, terms may be inaccurately recorded, and/or a disagreement on the contract terms may arise. Additionally, the tasks of tracking deliverable items and performing analysis is complicated by the separation of items from corresponding contracts.

SUMMARY

Techniques to link contracts to deliverable items are described herein. In one or more implementations, a contract service to collect and associate electronic signatures with contracts created to reflect terms for the purchase of deliverable items is implemented in an online retail environment for management of sale and delivery of items to consumers. The contract service facilitates real-time, online access to contracts between consumers and retailers for deliverable items at the time of delivery. In connection with a transaction between a consumer and a retailer for purchase of a deliverable item, a contract prepared for electronic signatures having an associated contract identifier is generated via the contract service. The contract service obtains an item identifier that is uniquely associated with the deliverable item and links the contract to the item identifier. Then, a web accessible interface (or other online communication system) is exposed to enable look-up of the contract using the item identifier as a reference. At the time of delivery, the web accessible interface is employed to access the contract prepared for electronic signatures from the contract service for viewing and signing.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

In a traditional approach, deliverable items such as shipping containers, consumer goods, and/or rental equipment are provided with physical contracts and/or may be handled separately from contracts that specify terms of the purchase/rental agreement. As such, a significant risk exists that an agent handling the delivery on behalf of a merchant may have incorrect documentation and/or a disagreement on the contract terms may arise.

Techniques to link contracts to deliverable items are described herein. In one or more implementations, an electronic document signature service is leveraged to create links between contract and items that are delivered by agents on behalf of sellers. To do so, a service is provided that enables generation of a contract for electronic signatures in connection with a transaction between a consumer and a retailer for purchase of a deliverable item. The contract service additionally creates links between the contract, the item, and/or other relevant data such as users' signature IDs, timestamps, and so forth. A web accessible interface is exposed to enable look-up of the contract using one or more links as a reference. At the time of delivery, the web accessible interface is employed to access the contract prepared for electronic signatures from the contract service for viewing of the contract terms and to facilitate electronic signing. In an implementation, an electronic document signature service, one example of which is Adobe EchoSign™, is leveraged to handle the electronic signing. The links that are formed may also be used to review transactions, create reports thru a reporting system, and perform other look-ups and analysis.

In this manner, a contract is directly associated with a physical item such that the contract can be easily and correctly identified at the time of delivery and accessed for electronic signatures. The risk of errors in contract terms is mitigated since the item ID is tied to the contract and the electronic document signature service is leveraged for handling the signing process.

In the following discussion, an example environment is first described that may implement the techniques described herein. Example details regarding the techniques are then discussed in relation to some example scenarios, diagrams, and procedures. Lastly, an example system and components of the system are discussed that may be employed to implement various techniques described herein.

Example Environment

Figure 1:
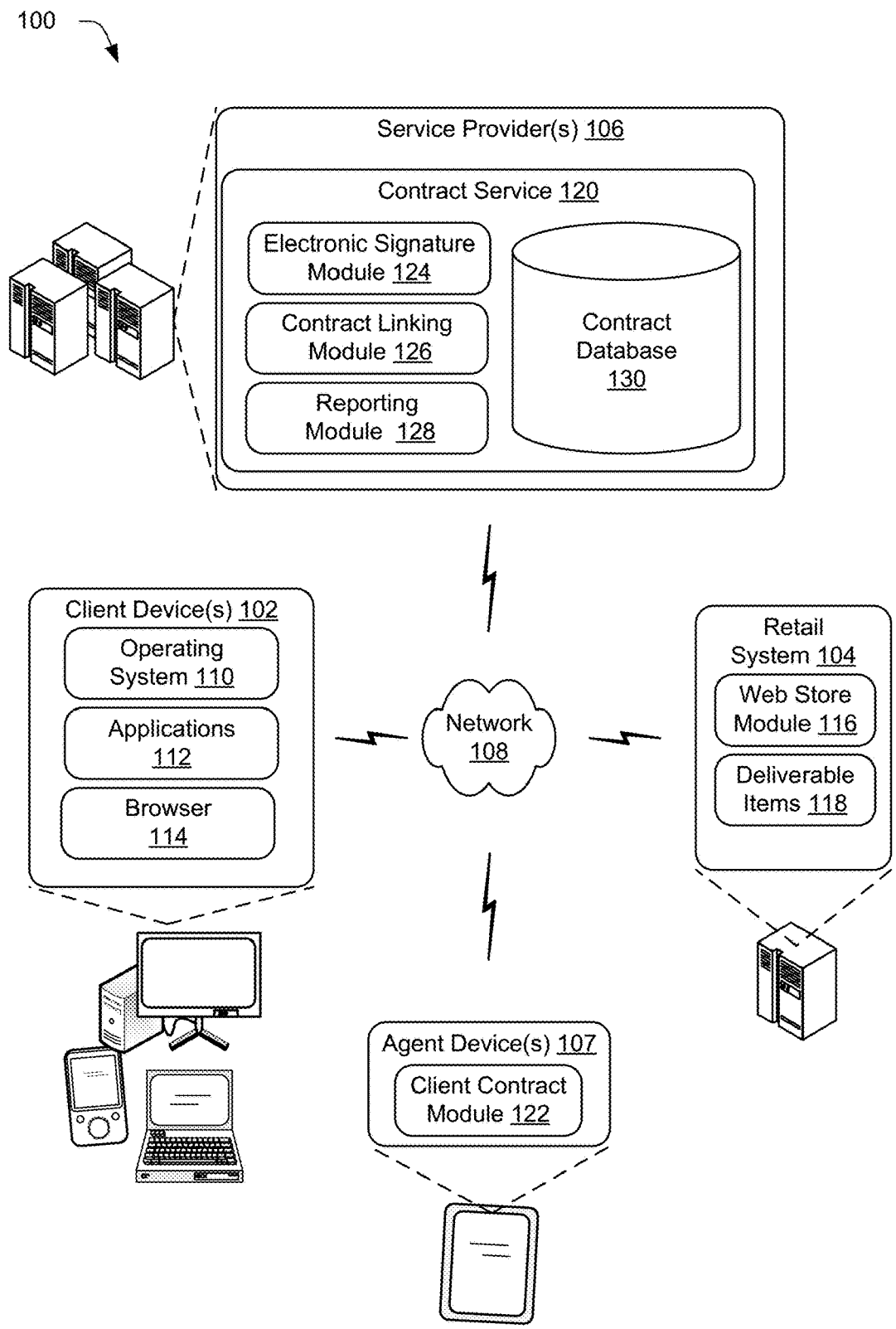
FIG. 1 is an illustration of an example operating environment that is operable to employ techniques for linking of contracts to deliverable items.

FIG. 1 is an illustration of an environment 100 in an example implementation that is operable to employ techniques described herein. The illustrated environment 100 includes one or more client devices 102, a retail system 104, a service provider 106, and one or more agent devices 107 that are communicatively coupled via a network 108. The one or more client devices 102, retail system 104, service provider 106, and one or more agent devices 107 may each be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 5.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, provides data to the operating system 110 to be rendered and displayed by a display device as illustrated without understanding how this rendering will be performed. A variety of applications 112 typically associated with devices are contemplated including, but not limited to, a document reader, a multi-media player, image editing software, a productivity suite that integrates multiple office productivity modules, games, and so forth. As a specific example of applications 112, the client device 102 is also illustrated as including a browser 114.

The retail system 104 represents a web accessible system or other communication system associated with a retailer, merchant, or seller that enables consumers to engage in consumer activities and purchases. For example the retail system 104 includes a web store module 116 that is representative of an on-line store front through which products and services may be offered to consumers. The web store module 116 is configured to provide access to view and purchase a variety of items including at least some deliverable items 118. For example, a client device 102 may be operable to navigate a browser 114 or other application to access web pages exposed via the web store module 116 and engage in purchase transactions for deliverable items 118 as well as related activities. Generally speaking, the deliverable items 118 as used herein refer to items that are uniquely identifiable (e.g., using an item id), are provided in association with a corresponding contract and terms, and may be delivered to consumers via an agent. It is noted that the agent may represent a third-party agent enlisted by the retailer or delivery operations integrated with and performed by the retailer. At the time of delivery, the agent may use an agent device 107 to look-up and manipulate contracts in the manner described in this document.

Additionally, the service provider 106 provides a contract service 120 as depicted in FIG. 1. The contract service 120 implements an integrated service (e.g., an electronic contract service system) for creation, electronic signing, management, and analysis of electronic contracts related to deliverable items 118. The contract service 120 is made accessible via a client contract module 122 that is deployed to the agent device 107 (as illustrated), client devices, or other devices to create, access, sign, and/or otherwise manipulate contracts including contracts for deliverable items 118.

In order to handle contracts on behalf of retailers, consumers, and agents, the contract service 120 includes or otherwise makes use of an electronic signature module 124, a contract linking module 126, and a reporting module 128. The electronic signature module 124 enables preparation of documents for electronic signatures (e.g., digital signatures) and affixing of electronic signatures to documents. The electronic signature module 124 operates in conjunction with client applications such as the client contract module 122, a browser 114, an email client, a business application, and so forth. Document preparers and signers may register with the contract service and have associated accounts through which corresponding data and contracts are made accessible. For example, the electronic signature module 124 may operate to prepare a contract document that is created via the contract service 120 for electronic signatures. The prepared document, a notification, and/or a link to access the document is then communicated to one or more designated signers via a suitable communication channel such as email, text messaging, or an application specific communication mechanism. Signers are then able to access and sign the documents using respective accounts and identifiers (e.g., signature identifiers). The electronic signature module 124 can facilitate pre-signed contracts that are signed in advance of delivery as well as contracts that are configured for execution at the time of delivery by adding signatures and finalizing terms.

The contract linking module 126 is operable to establish links between contracts and deliverable items 118. A variety of links are contemplated as described throughout this document. In an example, the contract linking module 126 is configured to associate a contract identifier associated with a purchase transaction with an item identifier that is uniquely associated with the deliverable item. The item identifier may then be used as a reference to look up the corresponding contract at the time of delivery and at other times. The item identifier may be an existing identifier for the item or an identifier that is produced and assigned directly by the contract linking module 126.

The reporting module 128 is operable to produce and output reports related to contracts that are managed via the contract service 120. In particular, the reporting module 128 may facilitate interaction with data that is maintained in a contract database 130. The contract database 130 is implemented by the contract service 120 to store and manage a variety of data related to contracts. Data represented by the contract database 130 includes, but is not limited to, user account data, authentication data (e.g., credentials and access privileges), electronic signature identifiers, signature data, contract records, contract documents, purchase transaction data, links established for contracts, and so forth. In this context, the reporting module 128 may be utilized by consumers, signers, agents, retailers, and other authorized parties to generate automated and on-demand reports to organize the contract data into different formats and views based on selected criteria, such as generating various reports according to input that specifies one or more of an item ID, signature ID, contract ID, time constraints, and so forth. The reports may make use of links that are established between contracts and items as described herein.

Although a retail environment is described, it should be appreciated that the techniques for contract linking can be employed in other scenarios and are not limited to transactions between consumers and retailers. For example, the systems and techniques discussed herein may also be used within a company to transfer items (e.g., from one warehouse to another), or in a barter situation between multiple parties. Generally, contract linking may be utilized any time a contract is involved in the exchange or movement of goods.

Details regarding these and other aspects of techniques for linking contracts to deliverable items are discussed in relation to the following figures.

Linking Contracts to Deliverable Items Details

Example Contract Service

Figure 2:
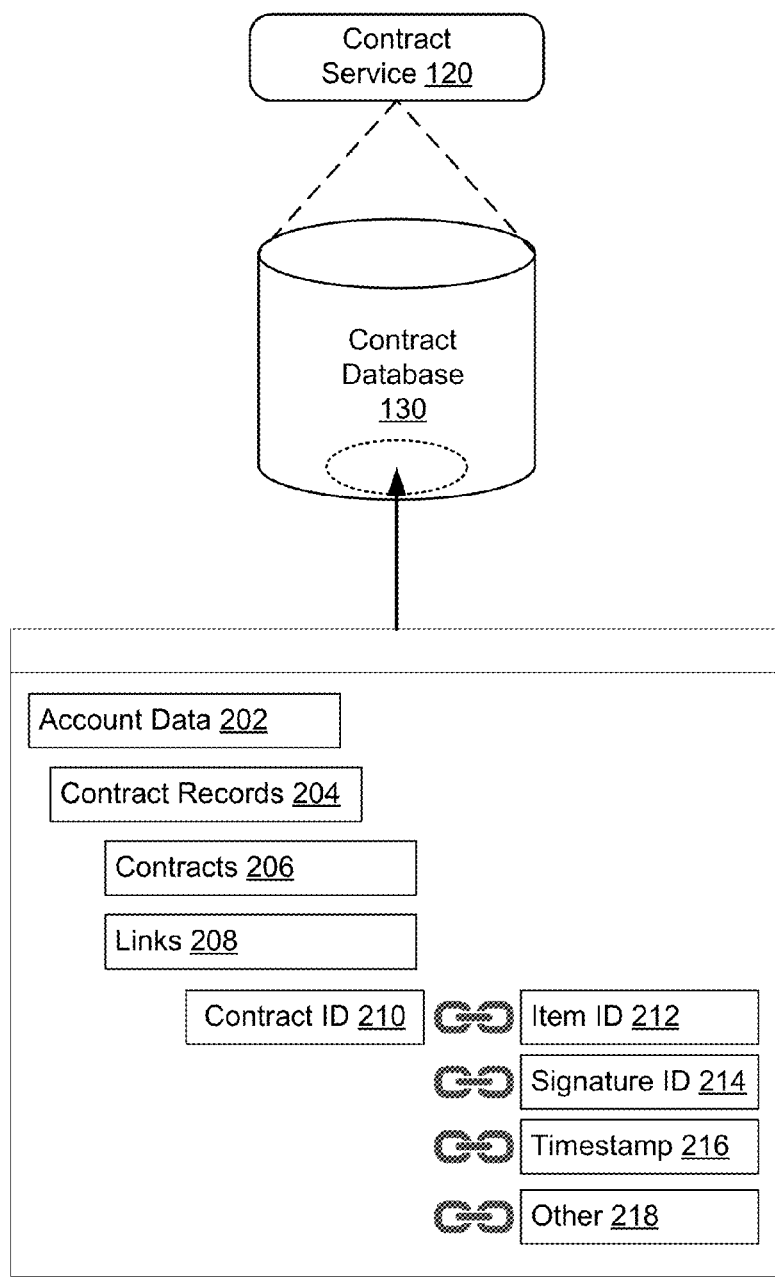
FIG. 2 is a diagram depicting example details of a contract service in accordance with one or more implementations.

To further illustrate details of the example techniques, consider now FIG. 2 which depicts generally at 200 a diagram that represents an example contract service 120 in accordance with one or more implementations. In particular, FIG. 2 illustrates details of example data and data structures that are maintained in a contract database 130 accessible via the contract service 120. As noted previously, the contract service 120 enables creation of contracts in conjunction with purchase transactions. The contract service 120 also facilitates electronic signing of electronic contracts and/or other documents via an electronic signature module 124. The electronic signature module 124 may provide functionality operable to interact with electronic signing capabilities that are built-in to the contract service 120. In addition or alternatively, the electronic signature module 124 may be configured to connect to and leverage an existing electronic document signature service to handle electronic signing, one example of which is Abode EchoSign™.

The contract service 130 additionally implements techniques described herein to link contracts to deliverable items. In particular, the contract service 120 has a contract linking module 126 as introduced previously that operates to establish links between contracts and items that may be reflected by data maintained in the contract database 130. As represented in FIG. 2, data maintained in the contract database 130 includes account data 202. The account data 202 represents data associated with accounts of users of the contract service 120, including consumer accounts, retailer accounts, and agent accounts. Account data 202 encompasses various data and records including for example user profile data, account authorizations, preferences, account credentials, and other data that is typically associated with user accounts. Account data 202 also includes contract records 204 for contracts 206 (e.g. electronic contracts) that are created between parties using respective accounts. For example, a contract record for a contract between a retailer and consumer may be stored in association with accounts for either or both of the retailer and consumer. The contract records 204 for the different contracts include the corresponding contract terms and details, statistical data, contract status information, identities and other information regarding the contract parties, and other data related to contracts 206.

Additionally, the contract records 204 are associated with links 208 that are formed for the contracts using the techniques described above and below. Various different kinds of links 208 are contemplated and multiple links may be established for a single contract. Generally, links are formed by creating and storing associations between contract identifying data and suitable reference data. For instance, a contract linking module 126 is operable to link a contract identifier 210 for a contract with an item identifier 212 that uniquely identifies a deliverable item to which the contract is directed. In this way, the item identifier 212 can be utilized as a reference to access a corresponding contract via the system. In many scenarios, the item identifier 212 alone is sufficient to find, retrieve, and view a contract of interest. For example, in the context of delivery of consumer goods and/or one time use items (e.g., a television, food products, or single-time service contract) the item identifier 212 provides adequate information to access a related contract. In other scenarios, such as for rental equipment, repeated services, and/or reused items, an item identifier 212 may potentially be used in conjunction with multiple different contracts, in which case identification of a particular instance associated with an item is accomplished using additional linking data. By way of example and not limitation, the links 208 in FIG. 2 are represented as additionally including links between the contract identifier 210 and signature IDs 214 for signing parties and timestamp 216 data that indicates the timing of particular transactions, contract creation, delivery, contract execution, and so forth. Other 218 types of links may also be established, such as links to identifiers associated with an agent, retailer identifiers, product categories, locations, and/or delivery characteristics, to name a few examples. Further details regarding techniques for linking contracts to deliverable items can be found in relation to the following example procedures.

Example Procedures

The following discussion describes example procedures that may be implemented utilizing the previously described systems and devices. The procedures represent example techniques that may be implemented in an online retail environment for management of sale and delivery of items to consumers to facilitate real-time, online access to contracts between consumers and retailers for deliverable items at the time of delivery. In particular, the procedures enable linking of contracts to deliverable items to make look-up, viewing, signing, and other interaction with contracts more efficient and less error prone. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the examples of FIG. 2. In at least some embodiments, the procedures may be performed by a suitably configured computing device(s), such one or more server devices associated with the service provider 106 that implement a contract service 120, or an agent device 107 or a computing device 102 of FIG. 1 that includes a suitable client contract module 112, application 114, or browser to interact with the contract service 120.

Figure 3:
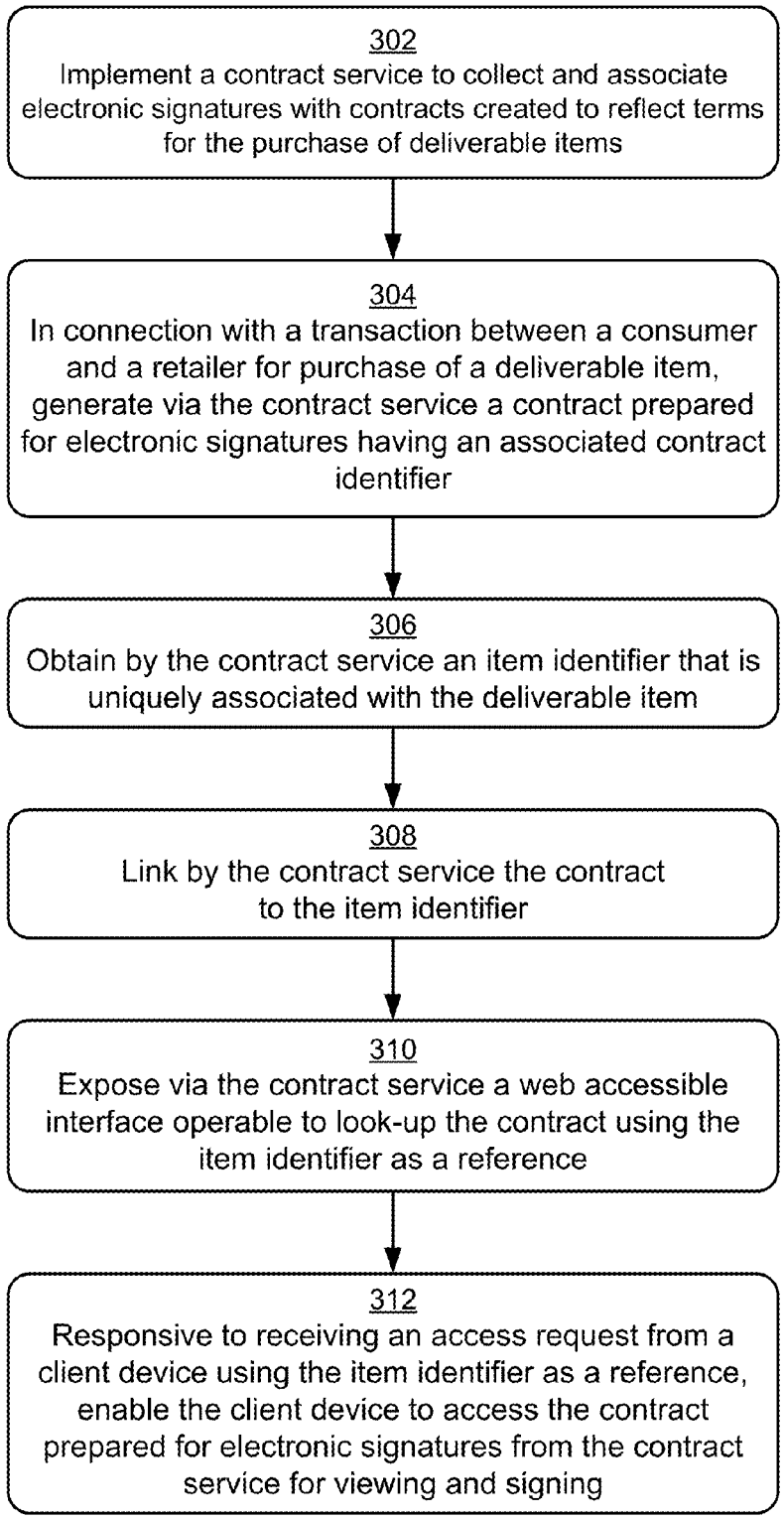
FIG. 3 is a flow diagram depicting an example procedure for linking of a contract to a deliverable item in accordance with one or more implementations.

FIG. 3 is a flow diagram depicting an example procedure 300 for linking of a contract to a deliverable item in accordance with one or more implementations. A contract service is implemented to collect and associate electronic signatures with contracts created to reflect terms for the purchase of deliverable items (block 302). For example, a service provider 106 may provide a contract service 120 that is configured and operates in the manner previously described. The contract service 120 enables parties to an on-line purchase transaction to define a contract for an item including negotiation and/or specifying of various terms for the purchase.

In connection with a transaction between a consumer and a retailer for purchase of a deliverable item, a contract prepared for electronic signatures having an associated contract identifier is generated via the contract service (block 304). For example, a retail system 104 through which a consumer engages in a purchase transaction may be configured to invoke the contract service 120 to generate a contract for a deliverable item, such as rental equipment, a shipping container, leased office space, consumer goods, and other items purchased under a contract. In one or more implementations, a dialog or other suitable user interface may be exposed via the contract service 120 to facilitate viewing and selection of terms for the contract. In this case, generating the contract includes obtaining input through the contract service to specify the contract terms and originating the contract document directly via the contract service based on the input. Additionally, the contract service 120 operates to format the contract for electronic signing, such as by invoking an electronic signature module 124 to configure the contract document to support electronic signatures. This may involve injecting signature portions, creating associations with one or more signers, converting one or portions of the document into a compatible format, associating the document with script or other executable code to facilitate signatures, and other operations designed to prepare the documents. In another approach, preparing the contract involves adapting an existing contract document that is provided to the contract service 120 as part of the purchase transaction. For example, a contract document created via the retailer system utilized to conduct a transaction for purchase of a deliverable item may be obtained from the retailer during the transaction. The contract service 120 then operates to adapt the contract document to support electronic signing as noted above. In other words, the contract service 120 is configured to support both contracts created directly via the service and externally created contract documents that are created outside of the contract service 120 and supplied to the contract service for adaptation.

In addition to preparing documents for electronic signatures, the contract service 120 also implements techniques to create links as discussed in this document. In one example approach, an item identifier is obtained by the contract service that is uniquely associated with the deliverable item (block 306). The item identifier may be configured in any suitable way to identify a corresponding item, such as being an alphanumeric code, a URL, an electronic cookie, an item label, or other data. The identifier p may encode a link or sufficient information to directly identify the contract (such as a link or URL to a record for the contract, an item specific barcode, and the like). In additional or alternatively, the identifier can encode a representation of credentials or access rights required for signing of the contract and used to verify authority of individuals attempting to sign.

In an example, the item identifier is configured as an existing identifier that is input to the contract service in connection with preparing the contract for electronic signatures. In this case, the contract service 120 provides a dialog or other mechanism to input the existing identifier as part of a sequence in which the contract is generated and prepared for electronics signing. In addition or alternatively, the contract service 120 is configured to generate item identifiers and assign the identifiers to deliverable items in connection with processing for a contract. For example, the contract service 120 creates item specific codes, labels, data or other identifiers for items that may be used to identify and reference items to which the identifiers are assigned. It should be noted that a contract may cover multiple items, in which case multiple item identifiers that are different for different items are employed.

The contract is linked to the item identifier by the contract service (block 308). This generally involves establishing and storing an association between the contract identifier and the item, and may be accomplished in various ways. By way of example, the contract database 130 may include a linking table or other data structure configured to reflect associations of a contract identifier 210 with linked values including linked item identifiers 212 as represented in the example of FIG. 2. The table or data structure may be referenced using linked values to access and interact with a corresponding contract. In another approach, contract records 204 may be adapted to include fields that contain values indicative of corresponding links. For example, fields may be included for linked items, signers, timestamp data, and so forth. In this case, queries that utilize appropriate linked values return corresponding contract records from the contract database 130. As noted, the linking includes at least linking of the contract to one or more item identifiers 212. In some scenarios, the linking includes linking of the contract to signature identifiers for one or more individuals designated as signers of the contract. This enables contract look-ups using the identity of a particular signer. Likewise, linking may additionally include linking of the contract to a retailer identifier corresponding to the retailer so that the retailer identity may also be employed for look-ups. Other linking data is also contemplated as noted previously, such as timestamps, locations, agent identifiers, product categories, and so forth.

A web accessible interface is exposed via the contract service that is operable to look-up the contract using the item identifier as a reference (block 310) and responsive to receiving an access request from a client device using the item identifier as a reference, access to the contract prepared for electronic signatures from the contract service for viewing and signing of the contract is enabled for the client device (block 312). For instance, the contract service 120 may be accessible to users via a client contract module 122 or other suitable application as noted previously. In particular, the contract service 120 may expose a web accessible interface that may be provided over a network to agent and client devices using an appropriate application. Through the interface, the contract services 120 operates to deliver contracts electronically over a network for viewing and signing. Accordingly, consumers, signers, and agents are able to access contracts from the service via the web accessible interface. The web accessible interface provides look-up functionality operable to obtain and view contracts using item identifiers and/or other linked values to reference appropriate contracts. Access to contracts may be selectively granted to devices based on item identifiers that are supplied in access requests. Naturally, the contract service 102 may also control access based on supplied credentials, access permissions, and authentication of users to accounts with the contract service 120.

Accordingly, when delivery of an item occurs, a consumer or agent may use a tablet, mobile phone, or other device to look-up a corresponding contract using an item identifier that is affixed to or otherwise associated with the delivered item. The contract is then viewable electronically to review/verify that terms and conditions of the contract. In this manner, on-line access to a contract is provided in connection with delivery of a purchased, leased, or rented item to a consumer by an agent of the retailer/seller.

Additionally, the contract service 120 provides functionality to facilitate electronics signatures as discussed herein. In one scenario, an agent handling delivery can pull-up the contract via a device and ask the consumer to verify and sign the contract at delivery. To do so, the consumer may "sign-in" to the contract service and make selections to interact with electronic signing capabilities. In response, the contract service 120 provides an interface through which the service is able to obtain input indicative of an electronic signature of the consumer. Then, the service affixes the electronic signature to the contract to create an electronically signed contract.

Still, the contract service 120 can be configured to provide notification regarding delivery and execution of the contract to associated parties. For example, contract service can immediately fire off a notification to interested parties as soon a contract has been entered into, signed, delivered, or when another designated even occurs. The notification can contain useful information, such as location, time, agent identifier, and so forth. This may assists a sender in determining if the agent is acting properly, and may assist a signer/consumer if the item is delivered to an incorrect location or some other anomaly occurs. Further, the contract service 120 can automatically detect controlling conditions such as location, address, time, day, etc. If controlling conditions do not match terms of the contract, the contract service 120 can generate a notification, request additional information, or prevent the delivery/transaction from occurring until the discrepancy is resolved.

Once signed, the electronically signed contract is then maintained via the contract database 130 and can be accessed using links as discussed herein. In one or more implementations, the contract may be kept for a period of time until the contract is deemed fulfilled. Upon receiving an indication of fulfillment of the contract, the contract service may deactivate the item identifier to prevent a situation in which an item identifier is used for multiple different transaction and therefore does not adequately distinguish between items and/or transaction instances. Of course, historical records of contracts and transactions may also be kept for future analysis and reports via a reporting module 128, further details of which are discussed below in relation to FIG. 4.

In one example implementation of the concepts and techniques discussed herein, a procedure to facilitate real-time, on-line access to contracts between consumers and retailers for deliverable items at the time of delivery to the consumers in the manner described is performed in an on-line retail environment for management of sale and delivery of items to consumers. The procedure involves generating, by an electronic contract service system (e.g., contract service 120) an electronic contract (e.g., contract 206) expressing terms for a transaction between a consumer and a retailer for purchase of a deliverable item. The generating may include assigning a contract identifier to the electronic contract and preparing the electronic contract for electronic signatures via electronic signing functionality of the electronic contract service system. Then, the electronic contract service system obtains an item identifier that is uniquely associated with the deliverable item. Further, the electronic contract service system links the electronic contract to the item identifier for the deliverable item by creating and storing a data record that forms an association between the item identifier and the contract identifier. Responsive to receiving a request from a client device the electronic contract service system communicates data to cause display of a user interface at the client device, the user interface operable to look-up electronic contracts available from the electronic contract service system using item identifiers as references. The electronic contract service system may receive the item identifier input via the user interface to initiate a look-up of the electronic contract, and access the data record that is created responsive to receiving the item identifier to retrieve the associated electronic contract. The electronic contract service system then communicates the electronic contract as a response to the request for display by the client device via the user interface to enable viewing of the terms of the electronic contract and electronic signing. Any of the features, concepts, and aspects discussed in this document may be combined in various combinations with the example procedure just described.

Figure 4:
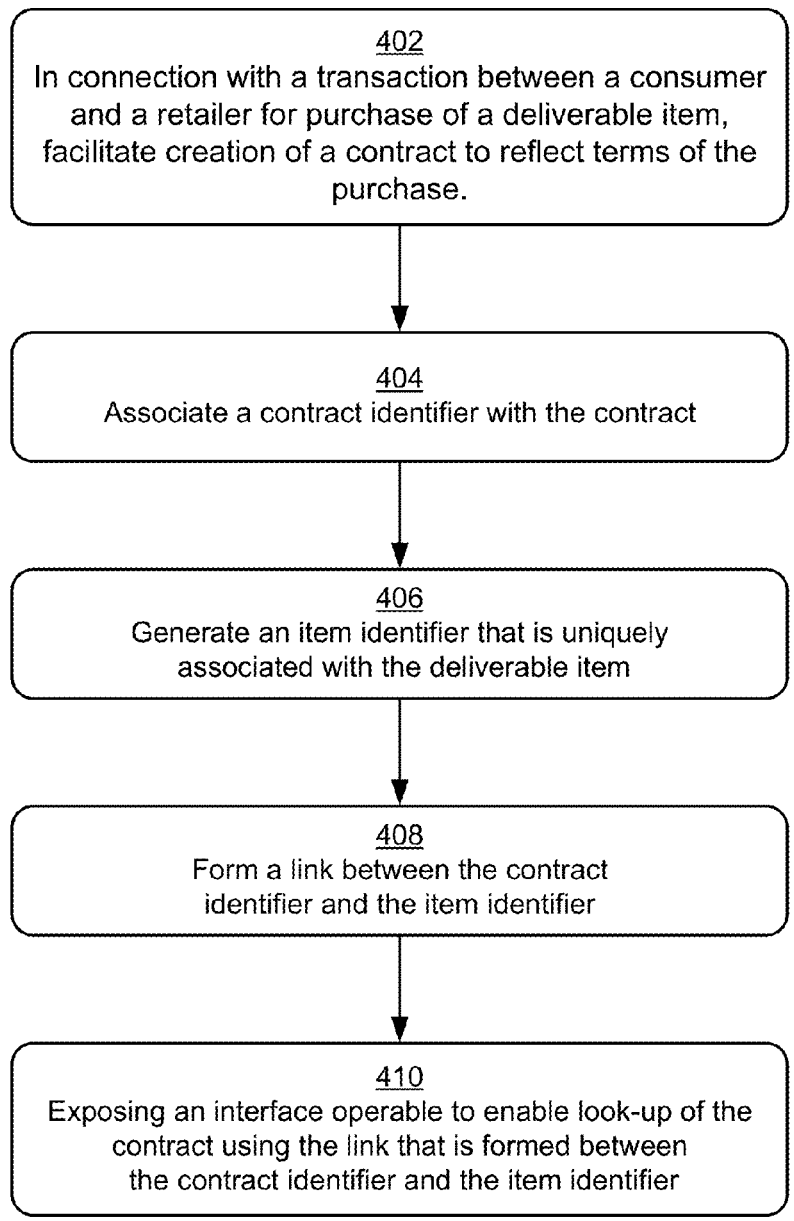
FIG. 4 is a flow diagram depicting an example procedure for contract creation via a contract service in accordance with one or more implementations.

FIG. 4 is a flow diagram depicting an example procedure 400 for contract creation via a contract service in accordance with one or more implementations. In connection with a transaction between a consumer and a retailer for purchase of a deliverable item, creation of a contract to reflect terms of the purchase is facilitated (block 402). In particular, a contract service 120 as described herein can be utilized to facilitate contract creation. In an example, facilitating creation of the contract is accomplished by exposing a dialog designed to accept input to define the contract and cause the contract service to originate the contract. Thus, in this scenario the contract is created directly though the service.

A contract identifier is associated with the contract (block 404) and an item identifier is generated that is uniquely associated with the deliverable item (block 406). Various types of identifiers for both the contract identifier and item identifiers are contemplated, examples of which were previously discussed. Here, the contract service 120 operates to generate both the contract identifier and item identifiers for the contract, rather than relying upon IDs that are supplied by the contract parties. Doing so provides the contract service with full control over the identifiers including creation, assignment, and lifecycle management (e.g., activation/deactivation) of the identifiers. This control increases the integrity of system and further reduces the chances of having transactions with incorrect contracts and/or terms. In one approach, the service is further configured to communicate an item identifier that is generated back to the retailer to enable affixing of the item identifier to a corresponding deliverable item. The item identifier is then readily available on the item being delivered when delivery occurs.

A link is formed between the contract identifier and the item identifier (408). Linking of identifiers and/or other linked values may occur in the manner discussed previously herein. Then, an interface is exposed that is operable to enable look-up of the contract using the link that is formed between the contract identifier and the item identifier (block 410). As noted, the contract service 120 may provide a dialog or other suitable interface to facilitate look-up and interaction with contracts. For example, a search interface may be provided that is configured to accept input of an item identifier 212, individually or along with other criteria, and initiate a search of contract records 204 and contracts 206 in response to the input. Input criteria are matched to contracts based on the links 208 that are created for a contract. Accordingly, an item identifier 212 affixed to or otherwise associated with an item is sufficient to look-up a corresponding contract. Other types of links 208 may be used in a comparable manner to find associated contracts 210 through the system.

In one or more implementations, the contract is also formatted for electronic signing via the contract service 120 as discussed herein. In this case, the contract service may be further configured to implement electronic signing functionality to collect and associate electronic signatures with contracts that are created to reflect terms for purchase of deliverable items. One or multiple parties may be designated as signers of the contract. Generally, at least the consumer receiving the delivered item is designated as a signer for the contract. Accordingly, look-up of the contract using links as described herein can occur at the time of delivery to enable the consumer to view the contract and effectuate electronic signing of the contract via the contract service.

Reporting

In addition to contract creation, contract management, and electronic signature functions, a contract service 120 may provide a set of reporting features designed to leverage the links 208 that are formed using the described techniques. For example, the contract service 120 may include or make use of a reporting module 128 to provide access to contract records for analysis and report generation. Reports may be configured to make use of item identifiers and other links to filter and organize data related to contracts into different views. The reporting module 128 may expose a reporting user interface through which various selection criteria and filters may be input to define reports and manipulate data that is maintained in a contract database 130. The system may be configured to support on demand reports and/or automated reports. Reports may be presented to user in various formats and through different communication mechanisms, such as being displayed on-screen of a device, configured as portable document file or as another designated file format, sent to selected e-mail address, and so forth.

For example, a report may be created to show contracts and transaction associated with a particular signer using a signature identifier as a filter. Likewise, a report can be designed to show transactions associated with a selected retailer ID over a selected time period. In another example, reports can be designed to track metrics associated with transactions such as timing statistics, delivery metrics (on-time, delayed, etc.), status of transactions, listing of in process contracts that have not been signed, a completed contract review report, and so forth. A variety of other kinds of reports are also contemplated.

Having consider the foregoing example details, consider now a discussion of an example system and devices that may be employed for aspects of linking contracts to deliverable items in one or more implementations.

Example System and Devices

Figure 5:
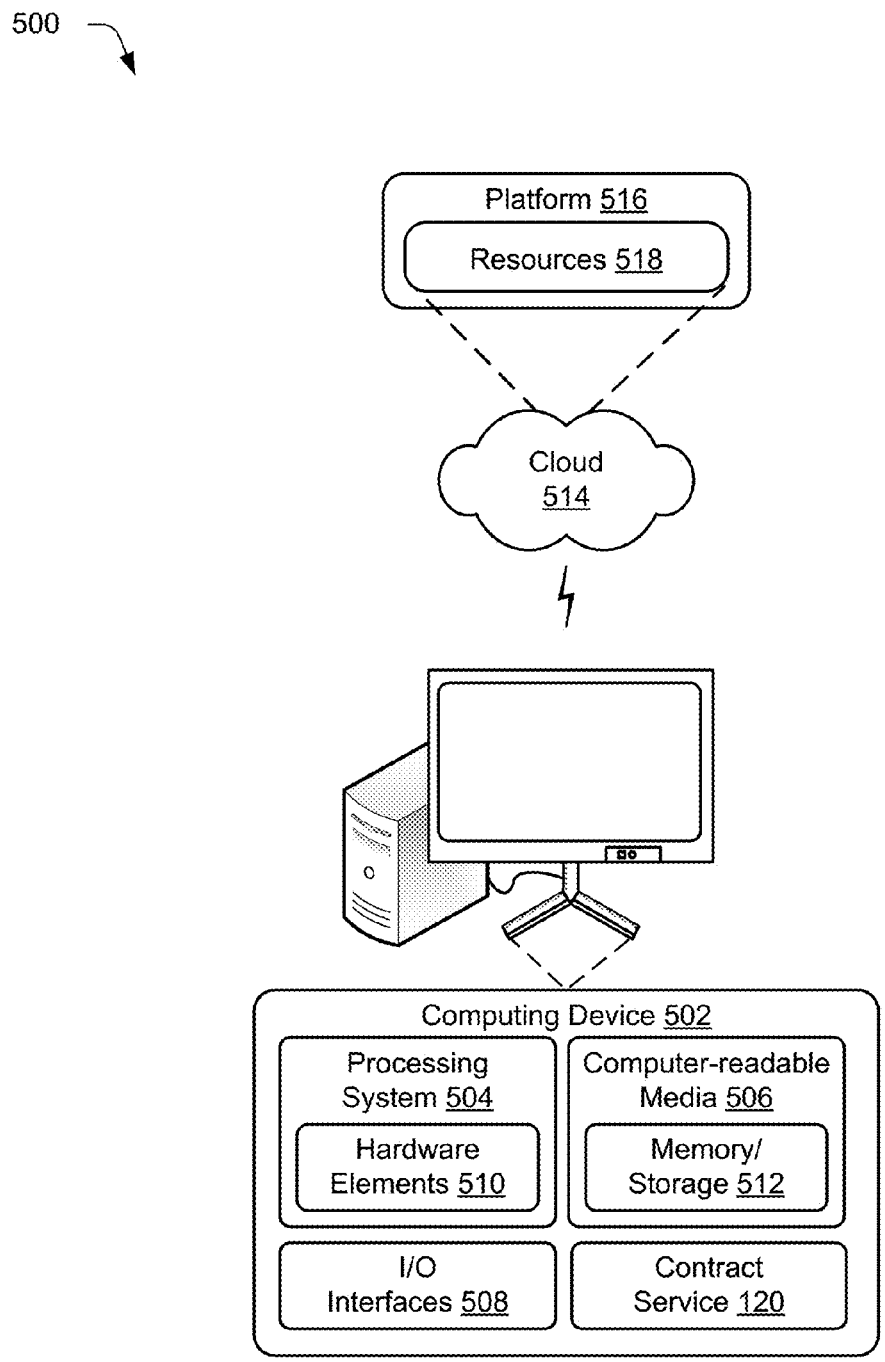
FIG. 5 illustrates an example system, devices, and components that can be employed to implement aspects of the techniques described herein.

FIG. 5 illustrates an example system generally at 500 that includes an example computing device 502 that is representative of one or more computing systems and/or devices that may implement the various techniques described herein. This is illustrated through inclusion of the contract service 120, which may be configured to provide functionality for contract creation and electronic signing to users of the service. Alternatively, the computing device may represent a client device that includes a browser 114 and/or a client contract module 122 to implement aspects of the described techniques. The computing device 502 may be, for example, a server of a service provider, a device associated with a client (e.g., a client or agent device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device embodiment, implementation of functionality described herein may be distributed throughout the system 500. For example, the functionality may be implemented in part on the computing device 502 as well as via the platform 516 that abstracts the functionality of the cloud 514.

CONCLUSION

Although aspects have been described herein in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. In an on-line retail environment for management of sale and delivery of items to consumers, a method to facilitate real-time, on-line access to contracts between consumers and retailers for deliverable items at the time of delivery to the consumers comprising:

generating, by an electronic contract service system, an electronic contract expressing terms for a transaction between a consumer and a retailer for purchase of a deliverable item, the generating including assigning a contract identifier to the electronic contract and preparing the electronic contract for electronic signatures via electronic signing functionality of the electronic contract service system;

obtaining by the electronic contract service system an item identifier that is uniquely associated with the deliverable item;

linking by the electronic contract service system the electronic contract to the item identifier for the deliverable item by creating and storing a data record that forms an association between the item identifier and the contract identifier;

responsive to receiving a request from a client device:
communicating data by the electronic contract service system to cause display of a user interface at the client device, the user interface operable to look-up electronic contracts available from the electronic contract service system using item identifiers as references;
receiving the item identifier input via the user interface to initiate a look-up of the electronic contract;
accessing the data record responsive to receiving the item identifier to retrieve the associated electronic contract;
communicating the electronic contract as a response to the request for display by the client device via the user interface to enable viewing of the terms of the electronic contract and electronic signing;
at the time of delivery, detecting, by the electronic contract service system, one or more controlling conditions to determine if the one or more controlling conditions match terms of the contract; and
responsive to the one or more controlling conditions not matching the terms of the contract, preventing delivery from occurring until a discrepancy associated with the one or more controlling conditions not matching the terms of the contract is resolved.

2. A method as described in claim 1, wherein the item identifier is assigned to the deliverable item by the electronic contract service system.

3. A method as described in claim 1, wherein the item identifier is an existing identifier that is input to the electronic contract service system in connection with preparing the electronic contract for electronic signatures.

4. A method as described in claim 1, further comprising:
obtaining input indicative of an electronic signature provided via the client device; and
affixing the electronic signature to the electronic contract to create an electronically signed contract.

5. A method as described in claim 1, wherein generating the contract comprises:
obtaining a contract document created via a retailer system utilized to conduct the transaction for purchase of the deliverable item; and
adapting the contract document to support electronic signing via the electronic contract service system.

6. A method as described in claim 1, wherein generating the contract comprises:
obtaining input by the electronic contract service system to specify the contract and terms; and
originating a contract document directly via the electronic contract service system that is formatted for electronic signing via the electronic contract service system.

7. A method as described in claim 1, wherein accessing the data record and communicating the electronic contract occur in connection with delivery of the deliverable item to the consumer by an agent of the retailer.

8. A method as described in claim 1, wherein the linking further comprises linking of the electronic contract to signature identifiers for one or more individuals designated as signers of the electronic contract including at least the consumer.

9. A method as described in claim 1, wherein the linking further comprises linking of the electronic contract to a retailer identifier corresponding to the retailer.

10. A method as described in claim 1, further comprising deactivating the item identifier responsive to receiving an indication of fulfillment of the electronic contract.

11. A method as described in claim 1, wherein the contract is associated with multiple deliverable items and linking by the electronic contract service system is performed for each of the multiple deliverable items to associate the electronic contract with corresponding item identifiers uniquely associated with the multiple deliverable items.

12. A method as described in claim 1, wherein the electronic signing functionality comprises an electronic document signing service implemented by the electronic contract service system to collect and associate electronic signatures with electronic contracts.

13. A method as described in claim 1, wherein the electronic contract service system is further configured to implement a reporting user interface through which various selection criteria and filters may be input to define reports and manipulate data related to electronic contracts that is maintained in a contract database using links established for the electronic contracts.

14. One or more computer-readable storage media comprising instructions that, when executed by a computing device, implement an electronic contract service system configured to perform operations to facilitate real-time, on-line access to contracts between consumers and retailers for deliverable items at the time of delivery to the consumers comprising:
generating, by the electronic contract service system, an electronic contract expressing terms for a transaction between a consumer and a retailer for purchase of a deliverable item, the generating including assigning a contract identifier to the electronic contract and preparing the electronic contract for electronic signatures via electronic signing functionality of the electronic contract service system;
obtaining by the electronic contract service system an item identifier that is uniquely associated with the deliverable item;
linking by the electronic contract service system the electronic contract to the item identifier for the deliverable item by creating and storing a data record that forms an association between the item identifier and the contract identifier;
responsive to receiving a request from a client device:
communicating data by the electronic contract service system to cause display of a user interface at the client device, the user interface operable to look-up electronic contracts available from the electronic contract service system using item identifiers as references;
receiving the item identifier input via the user interface to initiate a look-up of the electronic contract;
accessing the data record responsive to receiving the item identifier to retrieve the associated electronic contract;
communicating the electronic contract as a response to the request for display by the client device via the user interface to enable viewing of the terms of the electronic contract and electronic signing; and
at the time of delivery, detecting, by the electronic contract service system, one or more controlling conditions to determine if the one or more controlling conditions match terms of the contract; and
responsive to the one or more controlling conditions not matching the terms of the contract, preventing delivery from occurring until a discrepancy associated with the one or more controlling conditions not matching the terms of the contract is resolved.

15. One or more computer-readable storage media of claim 14, wherein generating the contract electronic contract comprises exposing a dialog designed to accept input to define terms of the electronic contract and cause the electronic contract service system to originate the contract.

16. One or more computer-readable storage media of claim 14, wherein the operations further comprises communicating the item identifier that is generated to the retailer to enable affixing of the item identifier to the deliverable item.

17. One or more computer-readable storage media of claim 14, wherein the operations further comprise:
obtaining input indicative of an electronic signature provided via the client device; and
affixing the electronic signature to the electronic contract to create an electronically signed contract.

18. In an on-line retail environment for management of sale and delivery of items to consumers, a computing system comprising:
a processing system;
one or more computer-readable media storing instructions that, when executed by the processing system, implement an electronic contract service system configured to perform operations to facilitate real-time, on-line access to contracts between consumers and retailers for deliverable items at the time of delivery to the consumers comprising:
generating, by the electronic contract service system, an electronic contract expressing terms for a transaction between a consumer and a retailer for purchase of a deliverable item, the generating including assigning a contract identifier to the electronic contract and preparing the electronic contract for electronic signatures via electronic signing functionality of the electronic contract service system;
obtaining by the electronic contract service system an item identifier that is uniquely associated with the deliverable item;
linking by the electronic contract service system the electronic contract to the item identifier for the deliverable item by creating and storing a data record that forms an association between the item identifier and the contract identifier;
responsive to receiving a request from a client device:
communicating data by the electronic contract service system to cause display of a user interface at the client device, the user interface operable to look-up electronic contracts available from the electronic contract service system using item identifiers as references;
receiving the item identifier input via the user interface to initiate a look-up of the electronic contract;
accessing the data record responsive to receiving the item identifier to retrieve the associated electronic contract;
communicating the electronic contract as a response to the request for display by the client device via the user interface to enable viewing of the terms of the electronic contract and electronic signing; and
at the time of delivery, detecting, by the electronic contract service system, one or more controlling conditions to determine if the one or more controlling conditions match terms of the contract; and
responsive to the one or more controlling conditions not matching the terms of the contract, preventing delivery from occurring until a discrepancy associated with the one or more controlling conditions not matching the terms of the contract is resolved.

19. A computing system as described in claim 18, wherein accessing the data record and communicating the electronic contract occur in connection with delivery of the deliverable item to the consumer by an agent of the retailer.

20. A computing system as described in claim 18, wherein the operations further comprise:
obtaining input indicative of an electronic signature provided via the client device; and
affixing the electronic signature to the electronic contract to create an electronically signed contract.

\* \* \* \* \*